(12) United States Patent
Muramoto et al.

(10) Patent No.: US 9,553,950 B2
(45) Date of Patent: Jan. 24, 2017

(54) COMMUNICATION CONTROL METHOD AND COMMUNICATION CONTROL APPARATUS

(71) Applicant: Panasonic Intellectual Property Management Co., Ltd., Osaka (JP)

(72) Inventors: Eiichi Muramoto, Kanagawa (JP); Yoshinori Matsui, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 72 days.

(21) Appl. No.: 14/675,876

(22) Filed: Apr. 1, 2015

(65) Prior Publication Data
US 2015/0289150 A1 Oct. 8, 2015

(30) Foreign Application Priority Data

Apr. 7, 2014 (JP) ................. 2014-078584

(51) Int. Cl.
*H04W 24/04* (2009.01)
*H04L 29/08* (2006.01)
(Continued)

(52) U.S. Cl.
CPC .............. *H04L 67/325* (2013.01); *H04L 1/08* (2013.01); *H04L 43/0829* (2013.01);
(Continued)

(58) Field of Classification Search
CPC ...... H04W 24/04; H04L 67/12; H04L 43/0858
See application file for complete search history.

(56) References Cited

U.S. PATENT DOCUMENTS 6,526,323 B1 2/2003 Miyajima et al.
7,653,507 B2 * 1/2010 Yamada ................ G01P 15/123
702/104

(Continued)

FOREIGN PATENT DOCUMENTS

JP 2000-330628 11/2000

OTHER PUBLICATIONS

Sirish Chandrasekaran et al., "TelegraphCQ: Continuous Dataflow Processing for an Uncertain World" CIDR,Jan. 5, 2003; Internet<URL:http://www-db.cs.wisc.edu/cidr/cidr2003/program/p24.pdf, searched on-line on Apr. 4, 2014>.

*Primary Examiner* — Wei Zhao
(74) *Attorney, Agent, or Firm* — Greenblum & Bernstein, P.L.C.

(57) ABSTRACT

A communication control method includes: receiving data, acquired by respective terminals, through a communication network; accumulating the received data in an information recording medium; obtaining an intra-network transmission time, which is an estimated value of a maximum time taken for transmission from when the data are acquired by the respective terminals until the data are received through the communication network; determining, of the accumulated data, the data whose time from an acquisition time point when the data is acquired by the terminal until a current time is shorter than the intra-network transmission time; excluding, of the accumulated data, the data whose time is determined to be shorter than the intra-network transmission time from data used for predetermined processing; and executing the predetermined processing by using the data excluding the data whose time is determined to be shorter than the intra-network transmission time.

9 Claims, 9 Drawing Sheets

(51) Int. Cl.
*H04L 12/26* (2006.01)
*H04L 1/08* (2006.01)
*H04W 4/00* (2009.01)
*H04W 84/18* (2009.01)

(52) U.S. Cl.
CPC ............ *H04L 43/106* (2013.01); *H04L 67/12* (2013.01); *H04W 4/006* (2013.01); *H04W 84/18* (2013.01)

(56) References Cited

U.S. PATENT DOCUMENTS

2003/0123430 A1* 7/2003 Hollatz ............... H04L 12/4612
370/352
2013/0114606 A1* 5/2013 Schrum, Jr. ........... H04L 45/023
370/395.53

* cited by examiner

COMMUNICATION CONTROL METHOD AND COMMUNICATION CONTROL APPARATUS

BACKGROUND

Technical Field

The present disclosure relates to a communication control method and a communication control apparatus that perform predetermined processing on the basis of data received from a plurality of terminals.

Description of the Related Art

An apparatus that collects data varying from moment to moment, the data being acquired by a plurality of terminals, and that performs predetermined processing on the basis of the collected data (such an apparatus is hereafter referred to as a "data aggregation apparatus") is used in a variety of fields (see, e.g., Japanese Unexamined Patent Application Publication No. 2000-330628 (hereinafter referred to as Patent Document 1)).

According to the technology (hereinafter referred to as "related art") disclosed in Patent Document 1, pieces of sensor information acquired by respective sensing terminals, such as water meters, are collected via wireless communication, and processing, such as displaying in a list, is performed based on the collected pieces of sensor information. According to such related art, it is possible to easily perform processing on the basis of data acquired by a large number of terminals.

SUMMARY

In one general aspect, the techniques disclosed here feature a communication control method for a communication control apparatus. The communication control method includes: receiving data, acquired by respective terminals, through a communication network; accumulating the received data in an information recording medium; obtaining an intra-network transmission time, which is an estimated value of a maximum time taken for transmission from when the data are acquired by the respective terminals until the data are received through the communication network; determining, of the data accumulated in the information recording medium, the data whose time from an acquisition time point when the data is acquired by the terminal until a current time is shorter than the intra-network transmission time; excluding, of the data accumulated in the information recording medium, the data whose time is determined to be shorter than the intra-network transmission time from data used for predetermined processing; and executing the predetermined processing by using, of the data accumulated in the information recording medium, the data excluding the data whose time is determined to be shorter than the intra-network transmission time.

It should be noted that general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

There is processing that is to be performed based on a collection of data acquired by a plurality of terminals by a certain point in time. One example of is processing for re-setting data transmission paths (topology) on the basis of data indicating up/down statuses (described below) of terminals included in a multi-hop communication network.

In particular, when data are collected via wireless communication, variations can occur in the times from when the data are acquired by the respective terminals until the data arrive at a data aggregation apparatus (the times may hereinafter be referred to as "transmission times"). Consequently, the order of time points at which the respective data are received by the data aggregation apparatus (these time points are hereinafter referred to as "reception time points") may differ from the order of time points at which the respective data are acquired by the terminals (these time points are hereinafter referred to as "acquisition time points").

When the related art is applied to the above-described processing, there is a possibility that, depending on the timing, the processing is performed in a state in which required data has dropped. That is, in the related art, there is a possibility that uniqueness and coherence cannot be maintained in the result of the processing.

To overcome the problems described above, the present disclosure provides a communication control method and a communication control apparatus that can maintain uniqueness and coherence in a result of processing performed based on data received from a plurality of terminals.

Embodiments of the present disclosure will be described below in detail with reference to the accompanying drawings.

Each of the embodiments described below is a specific example of the present disclosure. Numerical values, shapes, constituent elements, steps, the order of steps, and so on described in the embodiments below are merely examples and are not intended to limit the present disclosure. Of the constituent elements in the embodiments described below, the constituent elements not set forth in the independent claims that represent the broadest concept will be described as optional constituent elements. In all of the embodiments, the contents thereof may also be combined.

First Embodiment

A first embodiment of the present disclosure is one example of a general aspect of the present disclosure.

Figure 1A:
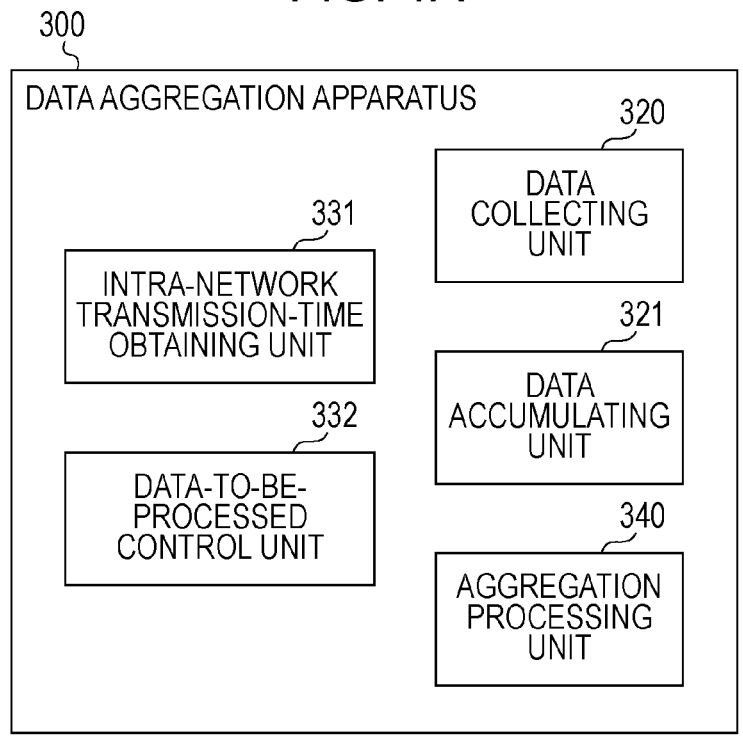
FIG. 1A is a block diagram illustrating one example of a functional configuration of a data aggregation apparatus according to a first embodiment.

FIG. 1A is a block diagram illustrating one example of the functional configuration of a data aggregation apparatus 300 according to the present embodiment.

In FIG. 1A, the data aggregation apparatus 300 serves as a communication control apparatus and includes a data collecting unit 320 corresponding to a data receiver, a data accumulating unit 321, an aggregation processing unit 340 corresponding to a processing executor, an intra-network transmission-time obtaining unit 331, and a data-to-be-processed control unit 332.

The data collecting unit 320 receives data, acquired by a plurality of terminals, from the terminals through a communication network.

The communication network includes, for example, a data transmission path established between the data aggregation apparatus 300 and any of the terminals or a transmission path established between the terminals.

The data accumulating unit 321 accumulates the received data. For example, the data accumulating unit 321 accumulates the received data in a writable information-recording medium included in the data aggregation apparatus 300. The writable information-recording medium refers to, for example, a hard disk or a writable memory.

The aggregation processing unit 340 executes predetermined processing on the basis of the data accumulated in the data accumulating unit 321 (more specifically, in the information recording medium).

The intra-network transmission-time obtaining unit 331 obtains, for example, an intra-network transmission time, which is an estimated value of a maximum time required for data transmission from when data is acquired by each of the terminals until the obtained data is received by the data collecting unit 320.

The data-to-be-processed control unit 332 excludes, from data on which the predetermined processing is to be performed, for example, data whose time from the acquisition time point at a terminal until the predetermined processing is performed on the data is shorter than the obtained intra-network transmission time.

Figure 1B:
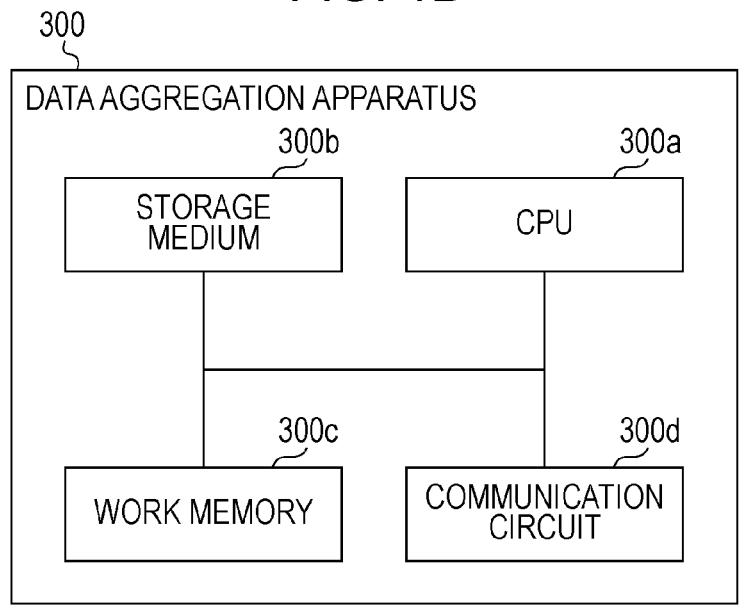
FIG. 1B is a block diagram illustrating one example of the hardware configuration of a data aggregation apparatus according to the first embodiment.

FIG. 1B is a block diagram illustrating one example of the hardware configuration of the data aggregation apparatus according to the first embodiment.

The data aggregation apparatus 300 is, for example, a computer including a central processing unit (CPU) 300a corresponding to a processor, a storage medium 300b such as a read only memory (ROM), a random access memory (RAM), or a hard disk, a work memory 300c such as a RAM, and a communication circuit 300d.

For example, a control program is stored in the storage medium 300b. The control program is, for example, pre-stored in the storage medium 300b during manufacture of a computer corresponding to the data aggregation apparatus 300.

Alternatively, the control program may be read from a computer-readable recording medium and be stored in the storage medium 300b.

The control program may also be downloaded through a network from a device in which the control program is accumulated and be stored in the storage medium 300b.

The control program includes, for example, a program for causing at least one of the data collecting unit 320, the data accumulating unit 321, the aggregation processing unit 340, the intra-network transmission-time obtaining unit 331, and the data-to-be-processed control unit 332 to function.

In the present embodiment, a description will be given of an example in which the control program includes a program for causing the data collecting unit 320, the data accumulating unit 321, the aggregation processing unit 340, the intra-network transmission-time obtaining unit 331, and the data-to-be-processed control unit 332 to function.

For example, the CPU 300a executes the control program to thereby cause the computer to function as the data aggregation apparatus.

In this case, the functions of the above-described units (i.e., the data collecting unit 320, the data accumulating unit 321, the aggregation processing unit 340, the intra-network transmission-time obtaining unit 331, and the data-to-be-processed control unit 332) are realized by the CPU 300a executing the control program.

Some of the functions of the data collecting unit 320, the data accumulating unit 321, the aggregation processing unit 340, the intra-network transmission-time obtaining unit 331, and the data-to-be-processed control unit 332 may be incorporated into a dedicated signal processing circuit (or a hardware circuit), which is not illustrated.

Examples of the signal processing circuit include an application-specific integrated circuit (ASIC) and a field programmable gate array (FPGA).

The data aggregation apparatus 300 having such a configuration can perform predetermined processing on received data, excluding data whose time from the acquisition time point when the data is acquired by a terminal until the predetermined processing is performed on the data is shorter than the intra-network transmission time. That is, for performing predetermined processing on the basis of a collection of data acquired by a certain point in time, the data aggregation apparatus 300 can prevent the predetermined processing from being performed in a state in which data dropping has occurred in the collection of data. Thus, the data aggregation apparatus 300 can maintain uniqueness and coherence in the result of the processing performed on the basis of received data from a plurality of terminals.

Second Embodiment

A second embodiment of the present disclosure is one example of a specific aspect when the present disclosure is applied to processing for controlling data transmission paths.

<Configuration of Communication System>

First, a description will be given of the configuration of a communication system to which the data aggregation apparatus according to the present embodiment is applied.

Figure 2:
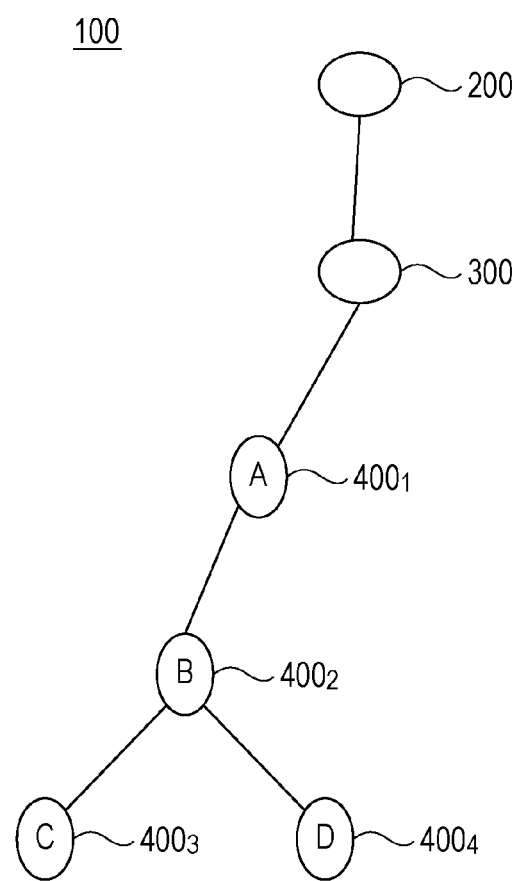
FIG. 2 is a system configuration diagram illustrating one example of the configuration of a communication system to which a data aggregation apparatus according to a second embodiment is applied.

FIG. 2 is a system configuration diagram illustrating one example of the configuration of a communication system to which the data aggregation apparatus according to the present embodiment is applied.

In FIG. 2, a communication system 100 includes an upstream terminal 200, a data aggregation apparatus 300, which is one example of a communication control apparatus, and first to fourth downstream terminals $400_1$ to $400_4$.

The upstream terminal 200 and the data aggregation apparatus 300 are connected to each other, for example, through a wired or wireless communication network.

The data aggregation apparatus 300 and the first to fourth downstream terminals $400_1$ to $400_4$ are connected, for example, through a communication network including a network for wireless communication.

The data aggregation apparatus 300 and the first to fourth downstream terminals $400_1$ to $400_4$ perform data transmission therebetween, for example, through data transmission paths established in the communication network.

For example, by using received data, the data aggregation apparatus 300 determines data transmission paths to be used for receiving data from the first to fourth downstream terminals $400_1$ to $400_4$.

For example, by using received data, the data aggregation apparatus 300 determines data transmission paths at predetermined time intervals.

This allows the data aggregation apparatus 300 to appropriately switch (or re-establish), for example, the data transmission paths established in the communication network.

In the example illustrated in FIG. 2, data obtained by the first to fourth downstream terminals $400_1$ to $400_4$ are transmitted to the data aggregation apparatus 300, for example, through the data transmission paths illustrated in FIG. 2.

In the example illustrated in FIG. 2, a data transmission path is established between the data aggregation apparatus 300 and the first downstream terminal $400_1$. A data transmission path is established between the first downstream terminal $400_1$ and the second downstream terminal $400_2$.

In addition, a data transmission path is established between the second downstream terminal $400_2$ and the third downstream terminal $400_3$, and a data transmission path is established between the second downstream terminal $400_2$ and the fourth downstream terminal $400_4$.

Data from the first to fourth downstream terminals $400_1$ to $400_4$ are transmitted to the data aggregation apparatus 300 along the above-described data transmission paths (or via any of the downstream terminals $400_1$ to $400_4$ on the above-described data transmission paths).

In the example illustrated in FIG. 2, data transmitted from the first downstream terminal $400_1$ is received by the data aggregation apparatus 300.

Data transmitted from the second downstream terminal $400_2$ is received by the data aggregation apparatus 300 via the first downstream terminal $400_1$.

Data transmitted from the third downstream terminal $400_3$ is received by the data aggregation apparatus 300 via the first downstream terminal $400_1$ and the second downstream terminal $400_2$.

Data transmitted from the fourth downstream terminal $400_4$ is received by the data aggregation apparatus 300 via the first downstream terminal $400_1$ and the second downstream terminal $400_2$.

Since the first to fourth downstream terminals $400_1$ to $400_4$ have substantially the same configuration, they are collectively described as downstream terminals 400, as appropriate. The first to fourth downstream terminals $400_1$ to $400_4$ are also referred to as "terminals A to D" in that order, as appropriate. The terminals A to D may be placed, for example, in buildings, respectively. The terminals A to D may also be installed, for example, in moving objects, respectively. Examples of the moving objects include transporting equipment, such as airplanes (e.g., helicopters) and vehicles (e.g., automobiles and trucks). The moving objects may be moving objects that allow automated unmanned driving or may be moving objects that are driven by humans.

It is also assumed that at least the data aggregation apparatus 300 and the downstream terminals 400 in the communication system 100 have corresponding wireless communication units and perform data transmission/reception via wireless communication. Examples of a communication system for the wireless communication include systems for Bluetooth (registered trademark), a wireless local area network (LAN), Digital Enhanced Cordless Telecommunications (DECT), ISA100, IEEE802.15.4, and Zig-Bee®.

The upstream terminal 200 is connected to the data aggregation apparatus 300 via wired communication or wireless communication to issue an instruction for executing predetermined processing to the data aggregation apparatus 300. The instruction is issued, for example, through transmission of a predetermined control packet.

In the present embodiment, the "predetermined processing" refers to processing that receives data including up/down information from the downstream terminals 400 and then appropriately switches (or re-establishes), based on the received up/down information, the data transmission paths to an optimum state so that data can be collected from as many downstream terminals 400 as possible. This processing is hereinafter referred to as "transmission-path control processing".

The up/down information refers to information indicating a state (an up/down status) as to whether or not each downstream terminal 400 can execute the functions of data acquisition, transmission, and transfer (hereinafter referred to as "terminal functions"). The up/down information includes event data indicating that the downstream terminal 400 enters a state in which it cannot execute the terminal functions of data acquisition, transmission, and transfer (i.e., it disengages) and event data indicating that the downstream terminal 400 enters a state in which it cannot execute the terminal functions (i.e., it recovers).

The data aggregation apparatus 300 receives data transmitted from the first to fourth downstream terminals $400_1$ to $400_4$ and accumulates the data. Then, in accordance with the above-described instruction from the upstream terminal 200, the data aggregation apparatus 300 performs the above-described transmission-path control processing on the basis of the up/down information of each downstream terminal 400, the up/down information being included in the accumulated data.

In the transmission-path control processing, the data aggregation apparatus 300 performs processing involving, for example, processing for determining a multi-hop data transmission path and for transmitting, to each downstream terminal 400, a packet giving an instruction for transmitting data through the determined data transmission paths. For example, the packet transmission may be performed using radio waves with an increased amount of electric power for wireless carrier waves or may be performed using wireless communication in a frequency band other than the frequency band used for the data transmission.

Each downstream terminal 400 acquires data and transmits the acquired data to the data aggregation apparatus 300. The data transmitted from the downstream terminal 400 to the data aggregation apparatus 300 may be accompanied by time-point information indicating the time point when the downstream terminal 400 acquired the data (an acquisition time point). More specifically, each downstream terminal 400 includes, for example, a sensor for detecting a predetermined state quantity. Each downstream terminal 400 encapsulates, as at least part of the data, a result of the detection and time-point information (e.g., a timestamp) indicating the detection time (the acquisition time point) and transmits the resulting data to the data aggregation apparatus 300. For example, each downstream terminal 400 encapsulates the data into a packet and transmits the packet to the data aggregation apparatus 300 through the data transmission paths established in the communication network.

The "predetermined state quantity" as used herein includes, for example, an air temperature, a humidity, acceleration, a position, or a time point. The predetermined state quantity also includes information indicating the on/off state of a particular switch or the switching thereof or a communication status (e.g., the transition of a radio-wave strength, the degree of change in the modulation and demodulation system, or an error rate of received signals) of wireless communication with another nearby downstream terminal 400 or a base station. Also, when an event in which the up/down state of another nearby downstream terminal 400 changes occurs, the predetermined state quantity detected by the local downstream terminal 400 (or a detection result of the detection performed by the local downstream terminal 400) includes, for example, up/down information (event data about disengagement or recovery) of the nearby downstream terminal 400 connected to the local downstream terminal 400.

Each downstream terminal 400 has a function for performing multi-hop communication, which receives data acquired by another downstream terminal 400 and transfers the data, under the control that the data aggregation apparatus 300 performs on the data transmission paths. That is, each downstream terminal 400 packetizes the acquired data and transmits the packetized data to the data aggregation apparatus 300 directly or using multi-hop communication via another downstream terminal 400. Each downstream terminal 400 has a function for detecting missing or loss of transmitted packets and re-transmitting packets (i.e., dropped packets).

Each downstream terminal 400 also has functions for detecting dropping of packets received from another downstream terminal 400 through the communication network (or the data transmission paths established in the communication network) and for requesting the other downstream terminal 400, which is the transmission source of the packets, to re-transmit the dropped packets.

The data aggregation apparatus 300 also has functions for detecting dropping of packets received from the downstream terminal 400 through the communication network and for requesting the downstream terminal 400, which is the transmission source of the packets, to re-transmit the dropped packet.

Each downstream terminal 400 may have a function for changing the data transmission paths in multi-hop transmission in accordance with the status of communication between the nearby downstream terminal 400 and the data aggregation apparatus 300, independently of the route control performed by the data aggregation apparatus 300. Such a function can be realized by, for example, an Optimized Link State Routing (OLSR) protocol, an Ad hoc On-Demand Distance Vector (AODV) protocol, or the like.

In this case, the data transmission paths in an initial state at time t=t0 are assumed to be, for example, in the state illustrated in FIG. 2. That is, it is assumed that the terminal A (or the downstream terminal $400_1$) connects to the data aggregation apparatus 300 directly (i.e., without the involvement of another downstream terminal 400) and the terminal B (or the downstream terminal $400_2$) connects to the terminal A directly. It is further assumed that the terminal C (or the downstream terminal $400_3$) and the terminal D (or the downstream terminal $400_4$) connect to the terminal B directly and connect to the data aggregation apparatus 300 via the terminals A and B.

In the communication systems 100 having a configuration as described above, the data including the up/down information can be collected from the downstream terminals 400, and the data transmission paths can be controlled based on the collected data.

It is desirable that the data transmission paths be determined based on actual up/down statuses at the downstream side at a certain point in time. The actual up/down statuses can be determined with high accuracy by processing all of the pieces of up/down information, obtained at the downstream side by a certain point in time, in accordance with an order of acquisition time points (hereinafter referred to as an "acquisition order").

By processing all of the pieces of up/down information obtained at the downstream side by a certain point in time in accordance with the acquisition order, the data aggregation apparatus 300 can set appropriate data transmission paths corresponding to the actual up/down statuses at the downstream side at that point in time.

Now, assume a case in which the order of reception time points at the data aggregation apparatus 300 (hereinafter referred to as a "reception order") matches the acquisition order. This case corresponds to a case in which no matter which timing the transmission-path control processing was performed, all of the pieces of up/down information acquired at the downstream side by the acquisition time point of the up/down information received last time have been received. That is, it is possible to perform the transmission-path control processing in a state in which a collection of data that is needed to set appropriate data transmission paths is ready.

Meanwhile, there are cases in which the reception order and the acquisition order do not match each other in the communication system 100. In such cases, there is a possibility that the transmission-path control processing is started in a state in which all of the pieces of up/down information acquired at the downstream side by the acquisition time point of the up/down information received last time are not ready. That is, there is a possibility that the data aggregation apparatus 300 performs the transmission-path control processing in a state in which data dropping has occurred in a collection of data needed to set appropriate data transmission paths. When the transmission-path control processing is performed in a state in which such data drooping has occurred, there is a possibility that inappropriate data transmission paths are determined.

Accordingly, considering the intra-network transmission time, the data aggregation apparatus 300 executes the transmission-path control processing to thereby prevent the transmission-path control processing from being executed in a state in which data dropping has occurred in a collection of data needed to set appropriate data transmission paths.

More specifically, the data aggregation apparatus 300 performs the transmission-path control processing, excluding data whose time from the acquisition time point at the downstream terminal 400 until the current time is shorter than the obtained intra-network transmission time. The "intra-network transmission time" as used herein refers to an estimated value of a maximum time required for data transmission from when data is acquired by each downstream terminal 400 until the data is received by the data aggregation apparatus 300.

In the description below, the communication network at the upstream terminal 200 side, viewed from the data aggregation apparatus 300, in the communication system 100 is referred to as an "upstream side", as appropriate. Also, the communication network at the first to fourth downstream terminals 400₁ to 400₄ side, viewed from the data aggregation apparatus 300, in the communication system 100 is referred to as a "downstream side", as appropriate.

<Configuration of Data Aggregation Apparatus>

Next, a description will be given of the configuration of the data aggregation apparatus 300.

Figure 3:
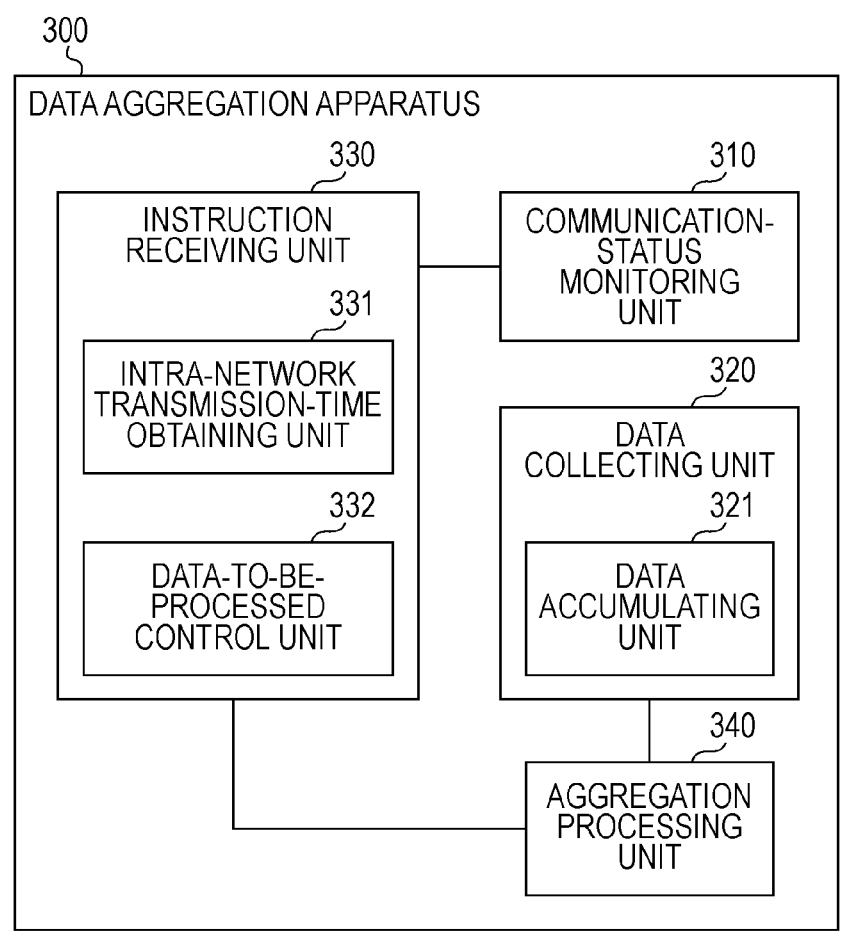
FIG. 3 is a block diagram illustrating one example of the configuration of the data aggregation apparatus according to the second embodiment.

FIG. 3 is a block diagram illustrating one example of the configuration of the data aggregation apparatus 300.

In FIG. 3, the data aggregation apparatus 300 includes a communication-status monitoring unit 310, a data collecting unit 320, an instruction receiving unit 330, and an aggregation processing unit 340.

The communication-status monitoring unit 310 periodically obtains, from the downstream side, information indicating a communication status indicating a packet-loss rate, a packet round-trip time, and so on (this information is hereinafter referred to as "communication status information") for each location at the downstream side in the communication network (e.g., for each downstream terminal 400 located on the transmission paths already established in the communication network at one point in time). The communication-status monitoring unit 310 records the obtained pieces of communication status information and performs statistical processing on the recorded pieces of communication status information for a plurality of time points (i.e., time-series data indicating changes in the communication status). The communication-status monitoring unit 310 holds a result of the statistical processing, for example, in the writable information-recording medium included in the data aggregation apparatus 300. Also, in response to a request for the latest communication status information, the request being issued from the instruction receiving unit 330, the communication-status monitoring unit 310 outputs the latest communication status information of the pieces of held communication status information, in the writable information-recording medium, to the instruction receiving unit 330.

The communication status information may be periodically obtained by the communication-status monitoring unit 310 issuing, to each downstream terminal 400, a request for acquiring and transmitting the communication status information or may be periodically obtained by each downstream terminal 400 dynamically acquiring and transmitting the communication status information. One example of a possible scheme for obtaining the packet-loss rate is using a recipient report defined in RFC 3550.

Examples of the statistical processing on the communication status information involve processing for smoothing each of the packet-loss rates and the round-trip times by using an exponentially weighted moving average and processing for adding an N multiple of the distribution value of observed values to each smoothed value (N is a value greater than or equal to 0).

The data collecting unit 320 receives data, acquired by the respective first to fourth downstream terminals 400₁ to 400₄, therefrom through the communication network (or the data transmission paths established in the communication network). The data collecting unit 320 has a data accumulating unit 321.

The data accumulating unit 321 accumulates the received data in a state (queue) in which the data are arranged in the order of the acquisition time points indicated by the time-point information that accompanies the data. When the data accumulating unit 321 receives, from the instruction receiving unit 330, a request for data for which the range of the acquisition time point is specified, the data accumulating unit 321 outputs corresponding data among the accumulated data to the instruction receiving unit 330.

Upon receiving, from the upstream terminal 200, a control packet giving an instruction for executing the above-described transmission-path control processing, the instruction receiving unit 330 causes the aggregation processing unit 340 (described below) to execute the transmission-path control processing. However, the instruction receiving unit 330 is adapted to allow the transmission-path control processing to be performed considering the intra-network transmission time of data. The instruction receiving unit 330 has an intra-network transmission-time obtaining unit 331 and a data-to-be-processed control unit 332.

In the following description, it is assumed that the transmission-path control processing is processing for executing a query for extracting pieces of event data, accumulated in the data accumulating unit 321, piece by piece in the order of the earliest acquisition time point to the most-recent acquisition time point at intervals of unit time dt and for re-establishing the data transmission paths in accordance with the extracted event data. This processing can be regarded, as a consequence, as processing for aggregating event data in accordance with the order of the time points indicated by the time-point information. The data aggregation apparatus 300 is assumed to delete event data, extracted from the data accumulating unit 321 and used for processing for re-establishing the data transmission paths, from the data accumulating unit 321 after re-establishment of the data transmission paths.

The intra-network transmission-time obtaining unit 331 obtains the latest communication status information from the communication-status monitoring unit 310, and obtains the intra-network transmission time at the downstream side on the basis of the communication status information. For example, the intra-network transmission-time obtaining unit 331 calculates the intra-network transmission time on the basis of a packet-loss rate and a packet round-trip time for each location at the downstream side. The intra-network transmission-time obtaining unit 331 then outputs the calculated intra-network transmission time to the data-to-be-processed control unit 332.

The data-to-be-processed control unit 332 causes the aggregation processing unit 340 to exclude, from data on which the transmission-path control processing is to be performed, data whose time from the acquisition time point at the downstream terminal 400 until the current time is shorter than the input intra-network transmission time. More specifically, the data-to-be-processed control unit 332 determines, as a data-uncertainty time period, a time period from the time point that is earlier than the current time by an amount of time corresponding to the intra-network transmission time until the current time. The data-to-be-processed control unit 332 outputs, to the aggregation processing unit 340, time-period information indicating the calculated data-uncertainty time period. That is, the data-uncertainty time period is a time period in which data that is not received can exist.

Each time the time-period information is input, the aggregation processing unit 340 obtains data accumulated in the data accumulating unit 321 and performs the transmission-path control processing on the basis of the obtained data. Thus, this means that each time the aggregation processing unit 340 performs the transmission-path control processing, the time-period information is input, that is, the communication status at each location at the downstream side in the communication network is obtained, and the intra-network transmission time is calculated based on the obtained communication status.

However, the aggregation processing unit 340 does not obtain, from the data accumulating unit 321, data whose acquisition time point is included in the data-uncertainty time period indicated by the input time-period information. That is, the aggregation processing unit 340 does not perform the transmission-path control processing on data whose time from the acquisition time point at each downstream terminal 400 until the current time is shorter than the input intra-network transmission time.

The data aggregation apparatus 300 has, for example, the CPU 300a, the storage medium 300b in which the control program is stored, the work memory 300c, and the communication circuit 300d, as illustrated in FIG. 1B. In this case, the functions of the above-described units can be realized by the CPU 300a executing the control program.

The data aggregation apparatus 300 having such a configuration can collect data from the downstream terminals 400 and can perform the transmission-path control processing based on the collected data, excluding data whose time from the acquisition time point until the time point when the transmission-path control processing is performed is shorter than the intra-network transmission time.

<Operation of Data Aggregation Apparatus>

Next, a description will be given of the operation of the data aggregation apparatus 300.

Figure 4:
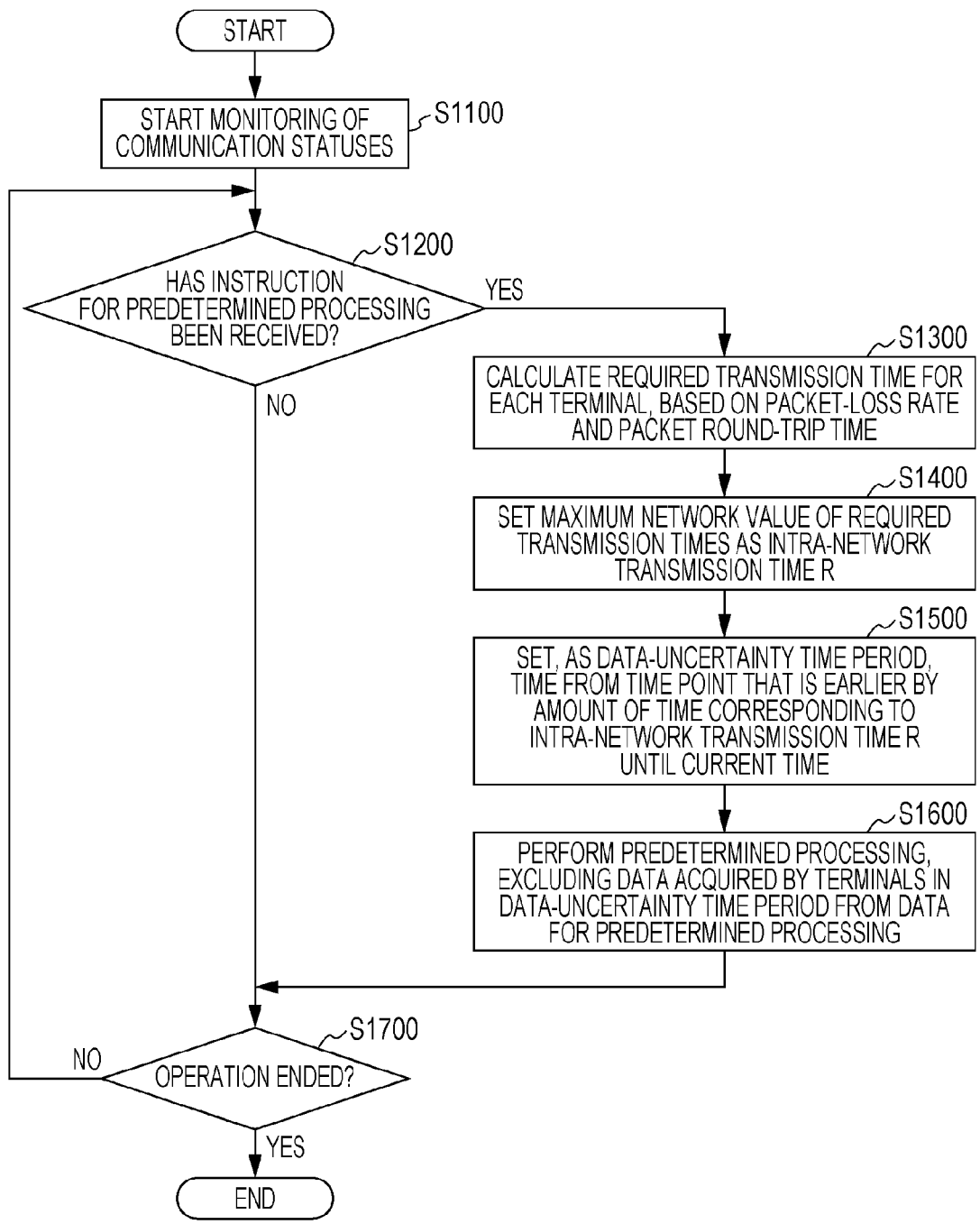
FIG. 4 is a flowchart illustrating one example of the operation of the data aggregation apparatus according to the second embodiment.

FIG. 4 is a flowchart illustrating one example of the operation of the data aggregation apparatus 300.

First, in step S1100, the communication-status monitoring unit 310 starts monitoring of communication statuses at the downstream side, that is, starts reception, accumulation, and statistical processing of the communication status information. The data collecting unit 320 also starts reception and accumulation of data from the downstream terminals 400.

In step S1200, the instruction receiving unit 330 determines whether or not it has received an instruction indicating that the transmission-path control processing (the predetermined processing) is to be performed. When the instruction receiving unit 330 has not received the instruction (NO in S1200), it advances the process to step S1700 described below. When the instruction receiving unit 330 has received the instruction (YES in S1200), it advances the process to step S1300.

For example, the upstream terminal 200 transmits the control packet giving an instruction for performing the transmission-path control processing (the predetermined processing). For example, by determining whether or not the control packet transmitted from the upstream terminal 200 has been received, the instruction receiving unit 330 determines whether or not it has received the instruction indicating that the transmission-path control processing (the predetermined processing) is to be performed.

The upstream terminal 200 transmits, for example, at intervals of unit time dt, the instruction indicating that the transmission-path control processing is to be performed. That is, for example, the control packet giving the instruction for performing the transmission-path control processing is input to the instruction receiving unit 330 at intervals of unit time dt.

In step S1300, the intra-network transmission-time obtaining unit 331 calculates a required transmission time $R_{S-T}$ for each downstream terminal 400 on the basis of the packet-loss rate and the packet round-trip time (for example, values obtained after the statistical processing) held in the communication-status monitoring unit 310. It is assumed that symbol S corresponds to the data aggregation apparatus 300, and symbol T corresponds to the Tth downstream terminal $400_T$. Symbols i and j indicate adjacent communication terminals (the data aggregation apparatus 300 or the downstream terminal 400) connected to each other through a link.

The required transmission time $R_{S-T}$ of the Tth downstream terminal $400_T$ is calculated, for example, in the following manner.

The round-trip time $RTT_{S-T}$ between the data aggregation apparatus 300 and the Tth downstream terminal $400_T$ has a value obtained by totaling round-trip times $RTT_{i-j}$ of all links that exist between the data aggregation apparatus 300 and the Tth downstream terminal $400_T$.

That is, in the case of the data transmission paths illustrated in FIG. 2, a round-trip time $RTT_{S-B}$ between the data aggregation apparatus 300 and the terminal B is given by:

$$RTT_{S-B} = RTT_{S-A} + RTT_{A-B} \quad (1)$$

where $RTT_{S-A}$ indicates the packet round-trip time between the data aggregation apparatus 300 and the terminal A, and $RTT_{A-B}$ indicates the packet round-trip time between the terminal A and the terminal B.

Also, a packet-loss rate $PLR_{S-T}$ between the data aggregation apparatus 300 and the Tth downstream terminal $400_T$ has a value obtained by totaling packet-loss rates $PLR_{i-j}$ of all links between the data aggregation apparatus 300 and the Tth downstream terminal $400_T$.

That is, in the case of the data transmission paths illustrated in FIG. 2, a packet-loss rate $PLR_{S-B}$ between the data aggregation apparatus 300 and the terminal B is given by:

$$PLR_{S-B} = 1 - \{(1-PLR_{S-A}) \times (1-PLR_{A-B})\} \quad (2)$$

where $PLR_{S-A}$ indicates the packet-loss rate between the data aggregation apparatus 300 and the terminal A, and $PLR_{A-B}$ indicates the packet-loss rate between the terminal A and the terminal B.

The intra-network transmission-time obtaining unit 331 calculates, for each downstream terminal (T), a smallest number of packet re-transmissions, $n_{S-T}$, that satisfies:

$$Q < (1-PLR_{A-T})^{n_{S-T}} \quad (3)$$

In this case, Q indicates a degree of reliability that takes a real number that is 0 or more and that is 1 or less, and is a system setting value indicating the degree to which data transmission is to be guaranteed in the communication system 100. For example, it is desirable that the degree of reliability, Q, be set to a value that is close to 1, and the degree of reliability, Q, may be a fixed value or a variable value. When the degree of reliability, Q, is set to a value of 0.9999, this means that it is guaranteed that 99.99% of data transmission succeeds in the communication system 100. That is, the communication system 100 is a system that ensures the degree of reliability, Q, required for re-transmission between the data aggregation apparatus 300 and each downstream terminal $400_T$.

The intra-network transmission-time obtaining unit 331 calculates the required transmission time $R_{S-T}$ in the following manner. The "required transmission time $R_{B-T}$" as used herein refers to an estimated value of a maximum time required from when data is acquired by the Tth downstream terminal $400_T$ until the data is received by the data collecting unit 320.

First, in accordance with the number of packet re-transmissions, $n_{i\text{-}j}$, of each terminal, a maximum packet round-trip time $R_{i\text{-}j}$ of each terminal is calculated by using:

$$R_{i\text{-}j} = \text{RTT}_{i\text{-}j} \times n_{i\text{-}j} \quad (4)$$

The total value of the calculated maximum packet round-trip time $R_{i\text{-}j}$ of each terminal is assumed to be the required transmission time $R_{B\text{-}T}$. That is, in the case of the data transmission paths illustrated in FIG. 2, for example, a required transmission time $R_{S\text{-}C}$ between the data aggregation apparatus 300 and the terminal C is given by:

$$R_{S\text{-}C} = (R_{S\text{-}A} + R_{A\text{-}B} + R_{B\text{-}C})/2 \quad (5)$$

Although the above-described scheme for calculating the required transmission time $R_{S\text{-}T}$ is predicated on a case in which a re-transmission mechanism in each link, which is a so-called re-transmission mechanism at layer 2, is used as a mechanism for re-transmission between the data aggregation apparatus 300 and the Tth downstream terminal 400$_T$, the present disclosure is not limited thereto. For example, the data aggregation apparatus 300 may calculate the required transmission time $R_{B\text{-}T}$, predicated on an end-to-end re-transmission mechanism between the data aggregation apparatus 300 and the Tth downstream terminal 400$_T$, that is, on a re-transmission mechanism at layer 4.

In step S1400, the intra-network transmission-time obtaining unit 331 determines a maximum value (a maximum network value) of the required transmission times $R_{S\text{-}A}$ to $R_{S\text{-}D}$ for all of the downstream terminals 400, that is, the first to fourth downstream terminals 400$_1$ to 400$_4$, from which data are collected. The intra-network transmission-time obtaining unit 331 sets the calculated value as the intra-network transmission time R described above.

Since the intra-network transmission time R is calculated using equations (1) to (5) (particularly, equations (3) to (5)), it is considered to be an estimated value of the maximum time that is required for data transmission and that includes the time required for a data re-transmission time.

The intra-network transmission time R is determined, for example, in the following manner. The intra-network transmission-time obtaining unit 331 sequentially calculates the required transmission times RTT for the first to fourth downstream terminals 400$_1$ to 400$_4$. The intra-network transmission-time obtaining unit 331 then repeats processing for comparing an immediately preceding calculated value with the latest calculated value to select a larger value and uses an eventually obtained value as the intra-network transmission time R.

There is a case in which it is guaranteed that the data aggregation terminal 300 and each downstream terminal 400 time-synchronize with each other in a margin for certain error E by using a global positioning system (GPS), Network Time Protocol (NTP) broadcasting, or the like. In this case, the intra-network transmission-time obtaining unit 331 may also use a value, obtained by adding the error E to the above-described maximum network value, as the intra-network transmission time R.

In step S1500 in FIG. 4, the data-to-be-processed control unit 332 sets, as a data-uncertainty time period, a time from a time point that is earlier than the current time by an amount of time corresponding to the intra-network transmission time R until the current time.

In step S1600, the aggregation processing unit 340 uses the data accumulated in the data accumulating unit 321 (or the information recording medium) to perform the transmission-path control processing (the predetermined processing).

However, with respect to each piece of the data accumulated in the data accumulating unit 321, the aggregation processing unit 340 determines whether or not it is data received by the data collecting unit 320 in the data-uncertainty time period.

The aggregation processing unit 340 then excludes the data, received by the data collecting unit 320 in the data-uncertainty time period, from data used for the transmission-path control processing. That is, the aggregation processing unit 340 uses, for the transmission-path control processing, only data received before the time point that is earlier than the start time point of the transmission-path control processing by an amount of time corresponding to the intra-network transmission time R, the data being included in the data accumulated in the data accumulating unit 321.

In this case, the difference between the current time used for determining the data-uncertainty time period in step S1500 and the time point when the transmission-path control processing is started in step S1600 is assumed to be 0 or a time interval that is small to a degree regarded as being 0. Of the data accumulated in the data accumulating unit 321, the data used for the transmission-path control processing is deleted from the data accumulating unit 321, as needed.

In step S1700, the instruction receiving unit 330 determines whether or not an instruction for ending the operation is given by a user operation or the like. When no instruction for ending the operation is given (NO in S1700), the instruction receiving unit 330 returns the process to step 1200. When an instruction for ending the operation is given, the instruction receiving unit 330 ends the series of processing (YES in S1700).

By performing such an operation, the data aggregation apparatus 300 can perform the transmission-path control processing on, of the accumulated data, only the data whose arrival order is guaranteed with the degree of reliability Q. Thus, when data that are required to recognize, with an accuracy corresponding to the degree of reliability, Q, the actual up/down statuses at the downstream side at a point in time that is earlier than the current time by an amount of time corresponding to the intra-network transmission time R are ready, the data aggregation apparatus 300 can perform the transmission-path control processing corresponding to that point in time. Thus, the data aggregation apparatus 300 can maintain uniqueness and coherence in the result of the transmission-path control processing.

<Specific Examples of Processing Process>

A state in which uniqueness and coherence are maintained in the result of the transmission-path control processing in the data aggregation apparatus 300 will be described below in conjunction with specific examples.

The description below will be given with reference to FIG. 5, which illustrates one example of changes in the up/down statuses at the downstream side.

Figure 5:
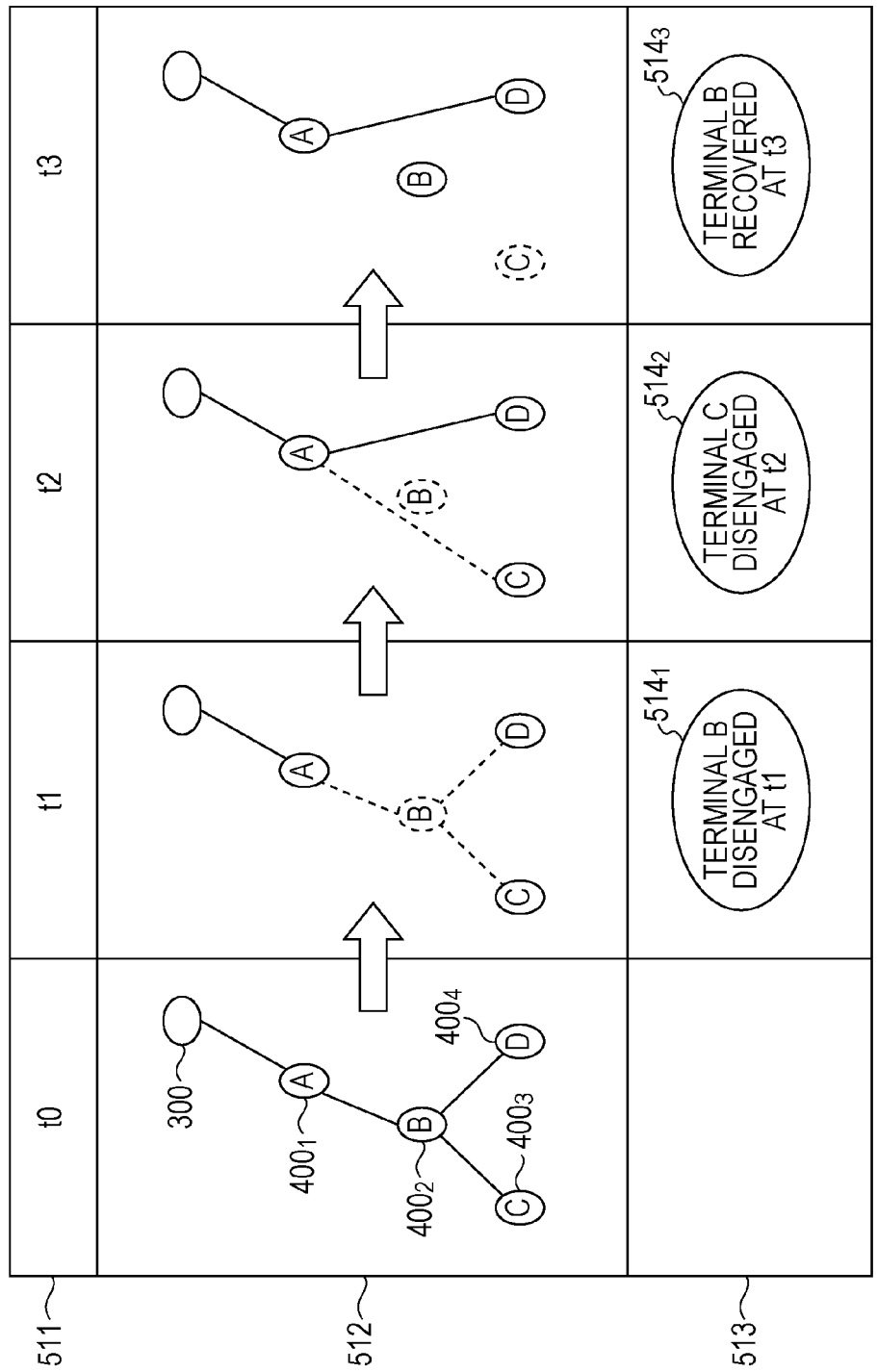
FIG. 5 illustrates one example of changes in up/down statuses at a downstream side in the second embodiment.

In FIG. 5, an upper section 511 indicates passage of time t, a middle section 512 illustrates data transmission paths at the downstream side and event data of the downstream terminals 400 at each time t, and a lower section 513 illustrates event data obtained by the downstream terminals 400 at each time t. In FIG. 5, each portion denoted by a dashed line represents a state in which the terminal functions are not executed.

For example, it is assumed that immediately before time t1, the terminal B enters a state in which it cannot execute the terminal functions (the B terminal disengages). In response, first event data 514$_1$ indicating that the terminal B disengaged at time t1 is obtained by, for example, the terminal A at time t1 and is transmitted to the data aggregation apparatus 300. Thus, when the terminal B disengages, it is desirable that the data transmission paths be changed to, for example, a state in which the terminal C and the terminal D are directly connected to the terminal A.

In addition, it is assumed that, immediately before time t2, the terminal C further enters a state in which it cannot execute the terminal functions (the terminal C disengages). In response, second event data $514_2$ indicating that the terminal C disengaged at time t2 is obtained by, for example, the terminal A at time t2 and is transmitted to the data aggregation apparatus 300.

In addition, it is assumed that, immediately before time t3, the terminal B enters a state in which it can execute the terminal functions (the terminal B has recovered). In response, third event data $514_3$ indicating that the terminal B recovered at time t3 is obtained by, for example, the terminal A at time t3 and is transmitted to the data aggregation apparatus 300. Thus, when the terminal B has recovered, it is desirable that the data transmission paths be changed to, for example, a state in which the terminal B is connected to the terminal D.

The first to third event data $514_1$ to $514_3$ are obtained at the downstream side in that order under an ideal situation. However, in practice, because of deterioration of the local communication statuses at the downstream side, packet re-transmission processing associated with the deterioration, and so on, there are also cases in which the order in which the first to third event data $514_1$ to $514_3$ arrive at the data aggregation apparatus 300 differs from the acquisition order of the first to third event data $514_1$ to $514_3$.

The data aggregation apparatus 300 performs processing based on the received data, considering the intra-network transmission time R, as described above.

Figure 6:
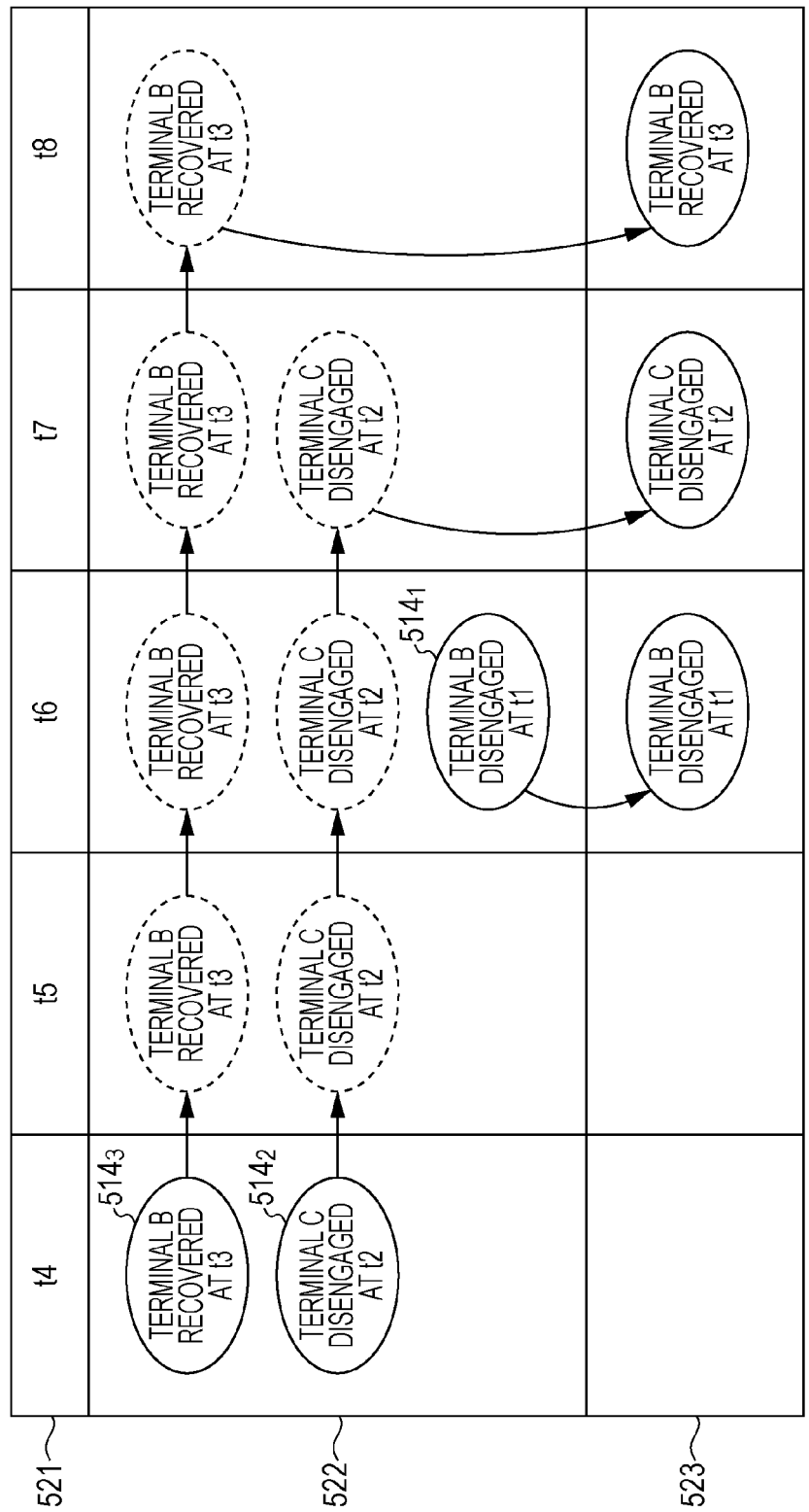
FIG. 6 illustrates one example of a state of processing in the second embodiment.

FIG. 6 illustrates one example of a state of processing performed by the data aggregation apparatus 300 when the intra-network transmission time R is considered.

In FIG. 6, an upper section 521 indicates passage of time t. A middle section 522 illustrates pieces of event data accumulated by the data accumulating unit 321 at times t4, t5, t6, t7, and t8. A lower section 523 illustrates pieces of data on which the transmission-path control processing is performed at times t4, t5, t6, t7, and t8. In FIG. 6, each portion denoted by a dashed line indicates a state in which event data whose storage was already completed at a past time.

When the time interval of time t=t0, t1, t2, . . . is a unit time dt, the intra-network transmission time R is assumed to be 4.5 dt (i.e., 4.5 times of the unit time dt). The intra-network transmission time R=4.5 dt indicates that, for example, the first event data $514_1$ indicating that the terminal B disengaged at time t1 arrives at the data aggregation apparatus 300 at time t5.5 at the latest with high probability (i.e., at a time point that is between a time point immediately after time t5 and a time point immediately before time t6 and that is a time point after 4.5 times of the unit time dt has passed from time t1).

For example, as illustrated in FIG. 6, at time t4, the second event data $514_2$ indicating that the terminal C disengaged at time t2 and the third event data $514_3$ indicating that the terminal B recovered at time t3 arrive at the data aggregation apparatus 300 and are accumulated. For example, at time t5.5 (i.e., at a time point immediately before time t6) that is later than time t4, the first event data $514_1$ indicating that the terminal B disengaged at time t1 arrives at the data aggregation apparatus 300 and is accumulated. That is, the transmission order of the first to third event data $514_1$ to $514_3$ is interchanged. It is assumed that, at times t0 to t3, no event data were received and accumulated.

The data-uncertainty time period at the point in time t5 is a period from the time point immediately after time t0 until time t5, because of the intra-network transmission time R=4.5 dt. The acquisition time points t2 and t3 of the second and third event data $514_2$ and $514_3$ (i.e., the time points when events have occurred) are included in the data-uncertainty time period from the time point immediately after time t0 until time t5. Thus, although the data aggregation apparatus 300 has accumulated the second and third event data $514_2$ and $514_3$ at the point in time t5, it does not regard the second and third event data $514_2$ and $514_3$ as data on which the transmission-path control processing is to be performed. There is also no event data that was received and accumulated at a past time point earlier than the data-uncertainty time period. Thus, the extraction result of event data indicates Null.

The data-uncertainty time period at the point in time t6 is a period from the time point immediately after time t1 until time t6. At the point in time t6, the data aggregation apparatus 300 has accumulated the first to third event data $514_1$ to $514_3$. The acquisition time points t2 and t3 of the second and third event data $514_2$ and $514_3$ are included in the data-uncertainty time period, which is the period from the time point immediately after time t1 until time t6. However, the acquisition time point t1 of the first event data $514_1$ is not included in the data-uncertainty time period, which is the period from immediately after time t1 until time t6. Thus, only the first event data $514_1$ is extracted as data on which the transmission-path control processing is to be performed. The data aggregation apparatus 300 performs the transmission-path control processing by using, for example, the first event data $514_1$.

The first event data $514_1$ in this case is event data indicating that the terminal B disengaged at time t1. Thus, the data aggregation apparatus 300 re-establishes the data transmission paths in the communication network, for example, for each of the terminals A, C, and D to transmit data to the data aggregation apparatus 300 without the involvement of the terminal B.

Also, the first event data $514_1$ is deleted from the data accumulating unit 321 (or the information recording medium) after being used for the transmission-path control processing (i.e., the processing for re-establishing the data transmission paths in the communication network).

Subsequently, since the acquisition time point t2 of the second event data $514_2$ is not included in a period from a time point immediately after time t2 until time t7, the period being the data-uncertainty time period at the point in time t7, the second event data $514_2$ is extracted.

The data aggregation apparatus 300 performs the transmission-path control processing by using, for example, the second event data $514_2$.

In this case, the second event data $514_2$ is event data indicating that the terminal C disengaged at time t2.

Thus, the data aggregation apparatus 300 re-establishes the data transmission paths in the communication network, for example, for the terminals A and D to transmit data to the data aggregation apparatus 300 without the involvement of the terminals B and C.

Also, the second event data $514_2$ is deleted from the data accumulating unit 321 (or the information recording medium) after being used for the transmission-path control processing.

Thereafter, since the acquisition time point t3 of the third event data $514_3$ is not included in a period from a time point immediately after time t3 until time t8, the period being the data-uncertainty time period at the time point in time t8, the third event data $514_3$ is extracted.

The data aggregation apparatus 300 performs the transmission-path control processing by using, for example, the third event data $514_3$.

In this case, the third event data $514_2$ indicates that the terminal B recovered at time t3.

Hence, the data aggregation apparatus 300 re-establishes the data transmission paths in the communication network, for example, for the terminal B to transmit data to the data aggregation apparatus 300.

Also, the third event data $514_3$ is deleted from the data accumulating unit 321 (or the information recording medium) after being used for the transmission-path control processing.

As described above, the data aggregation apparatus 300 sequentially performs the transmission-path control processing on the basis of the first to third event data $514_1$ to $514_3$ at respective times t6 to t8.

Figure 7:
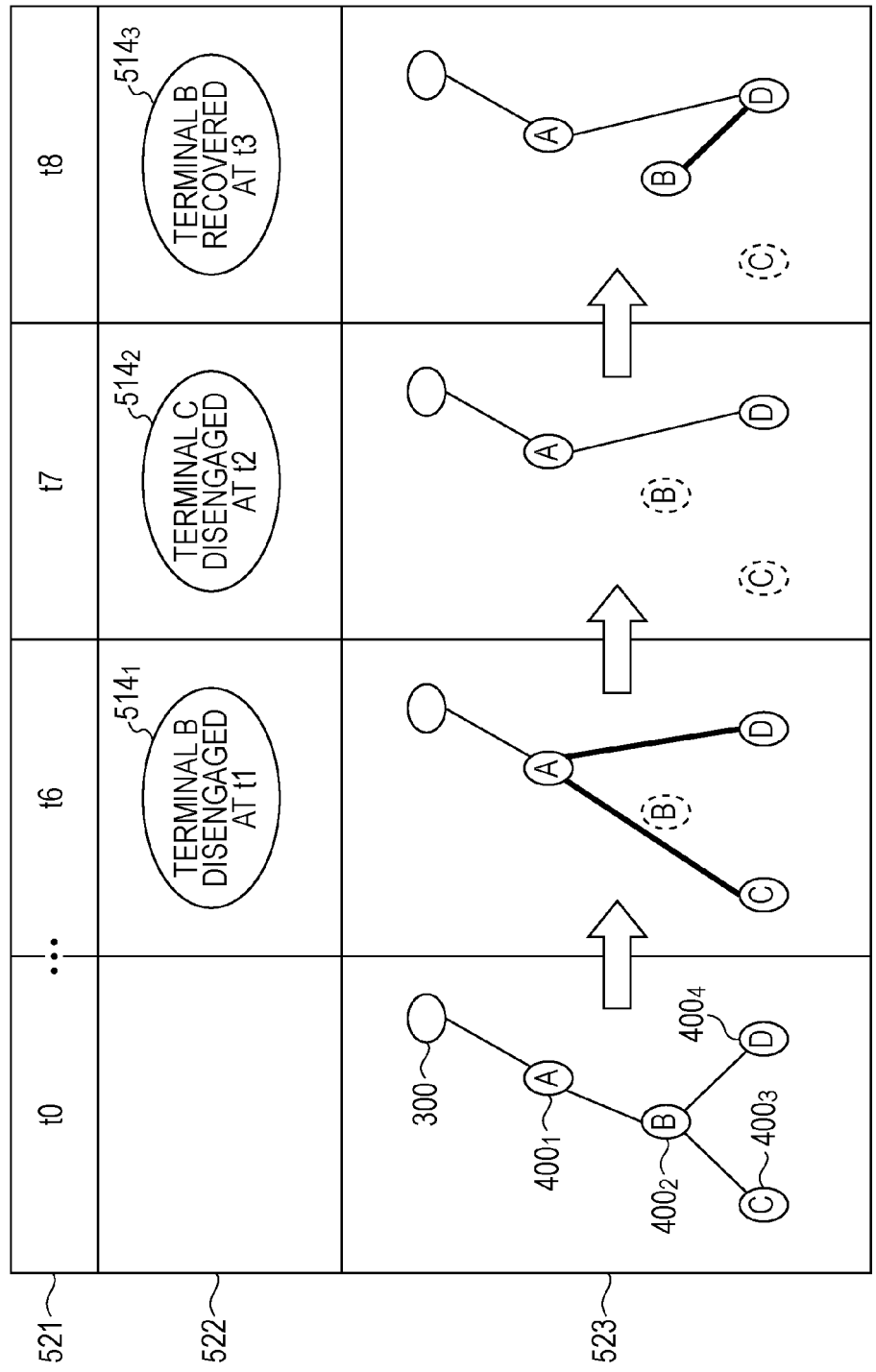
FIG. 7 illustrates one example of a result of the processing in the second embodiment.

FIG. 7 illustrates one example of a result of processing performed by the data aggregation apparatus 300, considering the intra-network transmission time R.

In FIG. 7, an upper section 531 indicates passage of time t, a middle section 532 indicates event data used for the transmission-path control processing at each time t, and a lower section 533 indicates a result of the transmission-path control processing at each time t (the data transmission paths at the downstream side). In FIG. 7, each portion denoted by a dashed line indicates a state in which the terminal functions are not executed, and each thick line indicate a newly set data transfer path.

As illustrated in FIG. 7, at time t6, the data-to-be-processed control unit 332 extracts the first event data $514_1$ indicating that the terminal B disengaged at time t1 and performs the transmission-path control processing. As a result, the terminal B is disconnected from the terminal A, and for example, the terminals C and D are connected to the terminal A.

At time t7, the data-to-be-processed control unit 332 extracts the second event data $514_2$ indicating that the terminal C disengaged at time t2 and performs the transmission-path control processing. As a result, the terminal C is disconnected from the terminal A.

In addition, at time t8, the data-to-be-processed control unit 332 extracts the third event data $514_3$ indicating that the terminal B recovered at time t3 and performs the transmission-path control processing. As a result, for example, the terminal B is connected to the terminal D.

Thus, the result of the transmission-path control processing performed by the data aggregation apparatus 300 brings about a state in which the terminal B is connected to the terminal D, that is, the desirable state of the data transmission paths described above and illustrated in FIG. 5.

Even if the order of reception time points differs from the order of acquisition time points because of deterioration of the communication statuses, the packet re-transmission processing, and so on, almost no data is received with a delay exceeding the intra-network transmission time R. Accordingly, data on which the transmission-path control processing is to be performed is determined considering the intra-network transmission time R, as described above, so that the transmission-path control processing can be performed based on an appropriate amount of data, and uniqueness and coherence can be maintained in the processing result.

In this case, for the sake of comparison, a description will be given of a state in which uniqueness and coherence are not maintained in the result of the transmission-path control processing when the intra-network transmission time is not considered.

Figure 8:
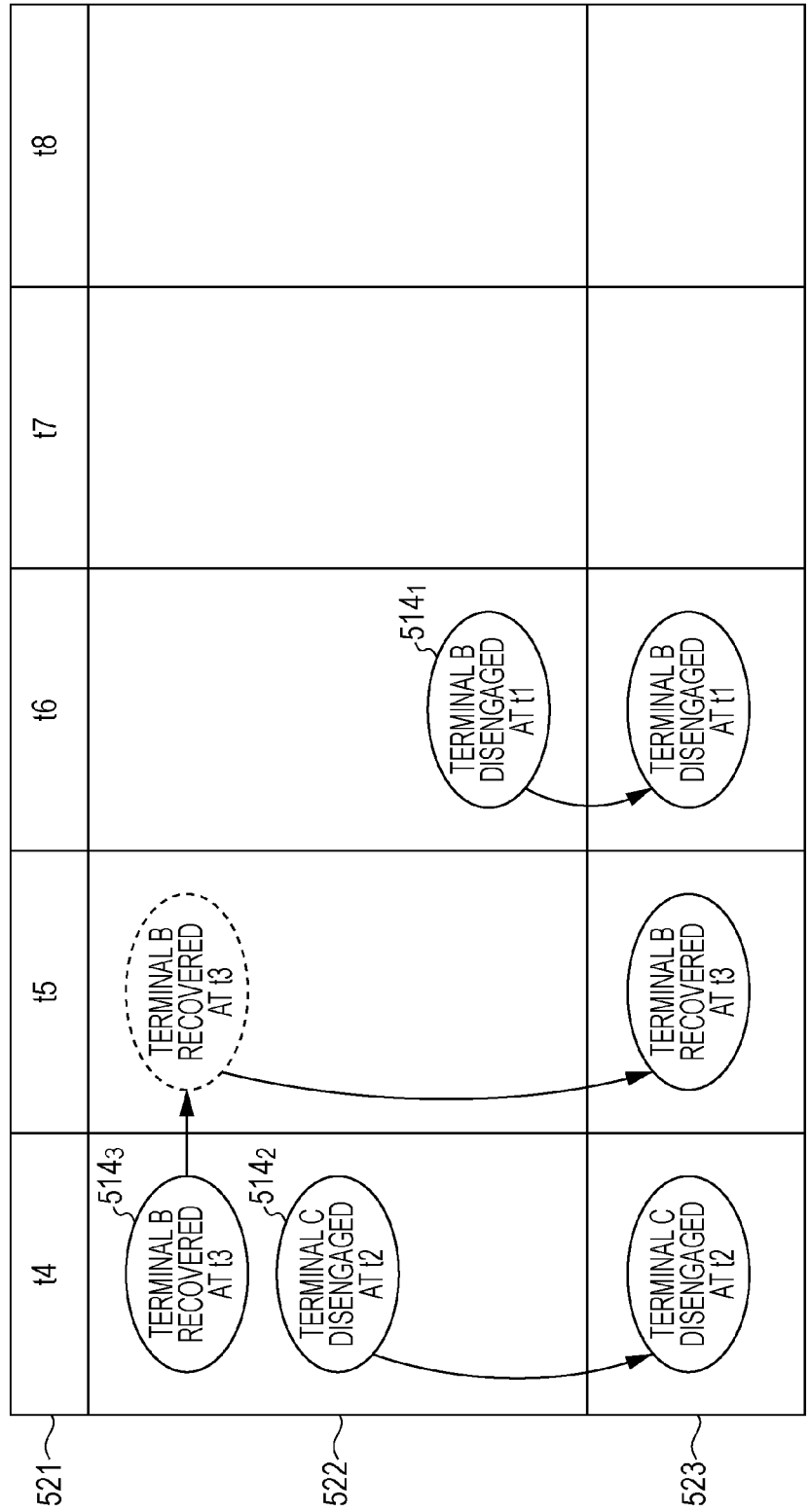
FIG. 8 illustrates one example of a state of processing when an intra-network transmission time is not considered.

FIG. 8 illustrates one example of a state of processing when the intra-network transmission time R is not considered, and corresponds to FIG. 6. Portions corresponding to those in FIG. 6 are denoted by the same reference numerals, and descriptions thereof are not given hereinafter.

When the intra-network transmission time R is not considered, the transmission-path control processing is performed based on the second event data $514_2$ at time t4, and the transmission-path control processing is performed based on the third event data $514_3$ at time t5. Thereafter, at time t6, the transmission-path control processing is performed based on the first event data $514_1$. That is, the transmission-path control processing is performed in the order of the second event data $514_2$, the third event data $514_3$, and the first event data $514_1$.

Figure 9:
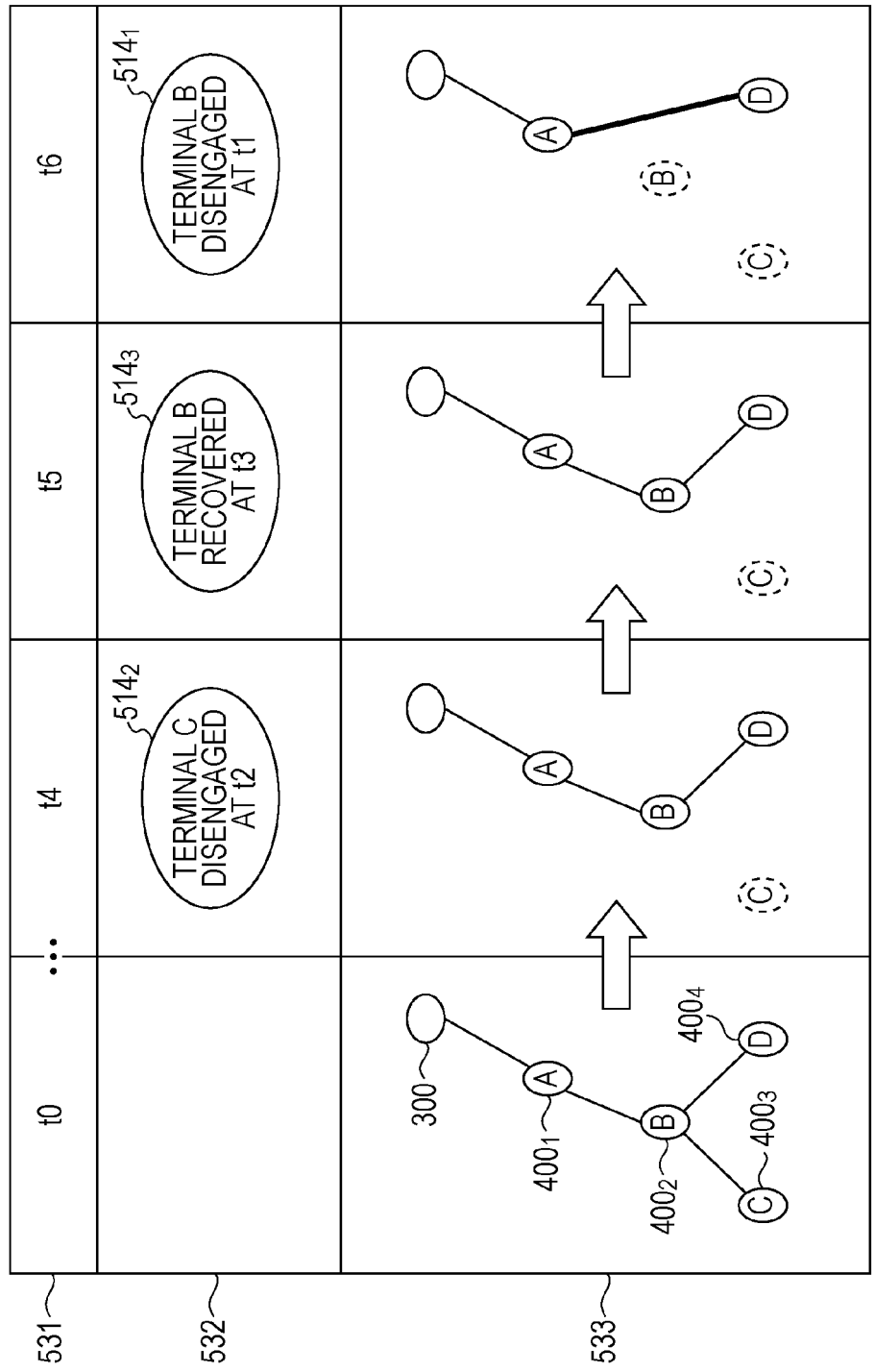
FIG. 9 illustrates one example of a result of the processing when the intra-network transmission time is not considered.

FIG. 9 illustrates one example of a result of processing when the intra-network transmission time R is not considered, and corresponds to FIG. 7. Portions corresponding to those in FIG. 7 are denoted by the same reference numerals, and descriptions thereof are not given hereinafter.

As illustrated in FIG. 9, at time t4, the data-to-be-processed control unit 332 extracts the second event data $514_2$ indicating that the terminal C disengaged at time t2 and performs the transmission-path control processing. As a result, the terminal C is disconnected from the terminal B.

At time t5, the data-to-be-processed control unit 332 extracts the third event data $514_3$ indicating that the terminal B recovered at time t3 and performs the transmission-path control processing. However, the terminal B is in a state in which it executes the terminal functions. Thus, the data-to-be-processed control unit 332 regards the third event data $514_3$ as erroneous data and thus disregards the third event data $514_3$.

In addition, at time t6, the data-to-be-processed control unit 332 extracts the first event data $514_1$ indicating that the terminal B disengaged at time t1 and performs the transmission-path control processing. As result, the terminal B is disconnected from the terminals A and D, and for example, the terminal D is connected to the terminal A.

When the intra-network transmission time R is not considered, the result of the transmission-path control processing indicates a state in which the terminal B remains disengaged, that is, a state that is different from that of the desirable data transmission paths described above with reference to FIG. 5.

As described above, in the case of the transmission-path control processing when the intra-network transmission time R is not considered, the processing result depends on the reception time point of each piece of event data and can further become inappropriate. In contrast, in the transmission-path control processing performed by the data aggregation apparatus 300 when the intra-network transmission time R is considered, the processing result does not depend on the reception time point of each piece of event data and becomes appropriate.

In general, when a wireless communication terminal is put into an isolated state, it executes an initialization sequence for connection after detecting a timeout, enters a phase for searching for a new connection, and executes a sequence for a lower layer, an authentication process for the downstream terminal 400, and so on. This series of operations is time-consuming. Thus, the data aggregation apparatus 300 can complete the optimization of the data transmission paths (i.e., can converge the processing result) earlier.

<Advantages of Present Disclosure>

As described above, the data aggregation apparatus 300 according to the present embodiment performs the transmission-path control processing, excluding event data that indicates the up/down status and whose time from the acquisition time point when the event data is acquired (i.e., the time point when an event occurs) until the transmission-path control processing is performed is shorter than the intra-network transmission time R. Thus, the data aggregation apparatus 300 according to the present embodiment can maintain uniqueness and coherence in the result of the transmission-path control processing and can complete the optimization of the data transmission path in a short time.

<Modifications>

When it is apparent that received data to be processed does not include a data-uncertainty time period, for example, because the data is very old, the instruction receiving unit 330 does not need to perform the determination of the data-uncertainty time period and the exclusion of data.

In step S1200 in FIG. 4, the instruction receiving unit 330 may also determine whether or not the processing for which an instruction was issued from the upstream terminal 200 can be executed.

For example, it is assumed that the instruction from the upstream terminal 200 is to execute data extraction processing, total-value calculation processing, or average-value calculation processing by using the Structured Query Language (SQL) (see e.g., Sirish Chandrasekaran, and ten others, "TelegraphCQ: Continuous Dataflow Processing for an Uncertain World", Conference on Innovative Data Systems Research (CIDR), Jan. 5, 2003; Internet URL: http://www-db.cs.wisc.edu/cidr/cidr2003/program/p24.pdf, searched on-line on Apr. 4, 2014). In this case, for example, the instruction receiving unit 330 causes the aggregation processing unit 340 to execute checking typically included in a processing system for the SQL, such as syntax checking and variable checking. In accordance with a result of the checking, the instruction receiving unit 330 determines whether or not the transmission-path control processing can be performed and transmits a determination result to the upstream terminal 200.

<Other Application Examples>

The above-described transmission-path control processing can be replaced with various types of processing to be performed based on a collection of data acquired by a plurality of terminals by a certain point in time.

Examples of such processing include a demand response process for aggregating the amounts of consumption from a plurality of electricity meters and performing peak cutting and giving a low-power consumption operation instruction. For example, data about the amount of power consumed at each home varies from moment to moment, depending on the operating states of household electrical and electronic equipment, such as a refrigerator, an air conditioner, a dryer, a toilet seat warmer, and induction heating (IH) cooking equipment. Methods for such a demand response process include a method for preforming control by using information from a sensor for measuring the amount of power consumption and a method for making a determination while using an event of changes in the on/off state of the power of each apparatus. With either of the schemes according to the present disclosure, it is possible to perform control while maintaining coherence. Examples of the above-described processing include automated platoon driving control processing in a system in which a plurality of trucks equipped with downstream terminals perform automated driving while forming a platoon and transmission-path control processing in a door-to-door package delivery system using an unmanned automated small helicopter equipped with a downstream terminal.

Also, even if data transmission is performed via only wired communication, it is possible to obtain the above-described advantages, since the reception order of data can be interchanged.

A communication control method according to the present disclosure is directed to a communication control method for a communication control apparatus. The communication control method includes: receiving data, acquired by respective terminals, through a communication network; accumulating the received data in an information recording medium; obtaining an intra-network transmission time, which is an estimated value of a maximum time taken for transmission from when the data are acquired by the respective terminals until the data are received through the communication network; determining, of the data accumulated in the information recording medium, the data whose time from an acquisition time point when the data is acquired by the terminal until a current time is shorter than the intra-network transmission time; excluding, of the data accumulated in the information recording medium, the data whose time is determined to be shorter than the intra-network transmission time from data used for predetermined processing; and executing the predetermined processing by using, of the data accumulated in the information recording medium, the data excluding the data whose time is determined to be shorter than the intra-network transmission time. With this configuration, uniqueness and coherence can be maintained in a result of processing performed based on data received from a plurality of terminals.

In the communication control method described above, each terminal may detect a predetermined state quantity, the received data may be transmitted from the each terminal, and the received data may include a detection result of the predetermined state quantity detected by the terminal that transmitted the data.

In the communication control method described above, the data may be accompanied by time-point information indicating time points when the terminal detected predetermined state quantities; and the predetermined processing may include processing for aggregating the data in accordance with an order of the time points indicated by the time-point information.

In the communication control method described above, the communication network may include a network for wireless communication, and in the obtaining the intra-network transmission time, a communication status of the communication network may be obtained each time the predetermined processing is performed, and the intra-network transmission time may be calculated based on the obtained communication status.

In the communication control method described above, in the receiving the data, data acquired by one of the terminals may be received via another terminal of the terminals; data transmitted from the respective terminals may include up/down information indicating up/down statuses of the respective terminals in the communication network; and the predetermined processing may include processing for controlling a transmission path of the data in the communication network, based on the up/down information.

In the communication control method, the data may be encapsulated into packets and be transmitted through the communication network. And the receiving the data may include: detecting a dropped packet in the packets; and requesting, when a dropped packet is detected, the terminal that is a transmission source of the dropped packet to re-transmit the dropped packet. And, in the obtaining the intra-network transmission time, the intra-network transmission time may be obtained by calculating an estimated value of a maximum time taken for transmitting the data, the maximum time including a time taken for a re-transmission time of the data.

In the communication control method described above, communication status information indicating a communication status of each terminal located on a transmission path established in the communication network may be obtained through the communication network, and the intra-network transmission time may be calculated based on the obtained communication status information.

In the communication control method described above, a processor may be used to perform at least one of the receiving the data, the accumulating the data, the obtaining the intra-network transmission time, the determining the data, the excluding the data, and the executing the predetermined processing.

A communication control apparatus according to the present disclosure is directed to a communication control apparatus used in a communication system. The communication control apparatus includes: a data receiver that receives data, acquired by respective terminals, through a communication network; a data accumulator that accumulates the received data in an information recording medium; an intra-network transmission-time obtainer that obtains an intra-network transmission time, which is an estimated value of a maximum time taken for transmission from when the data are acquired by the respective terminals until the data are received through the communication network; a data-to-be-processed controller that determines, of the data accumulated in the information recording medium, the data whose time from a time point when the data is acquired by the terminal until a current time is shorter than the intra-network transmission time and that excludes, from data used for predetermined processing, the data whose time is determined to be shorter than the intra-network transmission time; and a processing executor that executes the predetermined processing by using, of the data accumulated in the information recording medium, the data excluding the data whose time is determined to be shorter than the intra-network transmission time.

In the communication control apparatus described above, at least one of the data receiver, the data accumulator, the intra-network transmission-time obtainer, the data-to-be-processed controller, and the processing executor may include a processor.

The present disclosure is useful for a communication control method and a communication control apparatus that can maintain uniqueness and coherence in a result of processing performed based on data received from a plurality of terminals.

What is claimed is:

1. A communication control method for a communication control apparatus, the method comprising:
   receiving data, acquired by respective terminals, through a communication network that includes a network for wireless communication;
   accumulating the received data in an information recording medium;
   obtaining an intra-network transmission time, which is an estimated value of a maximum time taken for transmission from when the data are acquired by the respective terminals until the data are received through the communication network;
   determining, of the data accumulated in the information recording medium, the data whose time from an acquisition time point when the data is acquired by the respective terminals until a current time is shorter than the intra-network transmission time;
   excluding, of the data accumulated in the information recording medium, the data whose time is determined to be shorter than the intra-network transmission time from data used for predetermined processing; and
   executing the predetermined processing by using, of the data accumulated in the information recording medium, the data excluding the data whose time is determined to be shorter than the intra-network transmission time,
   wherein in the obtaining the intra-network transmission time, a communication status of the communication network is obtained each time the predetermined processing is performed, and the intra-network transmission time is calculated based on the obtained communication status.

2. The communication control method according to claim 1,
   wherein each terminal detects a predetermined state quantity,
   the received data is transmitted from the each terminal, and
   the received data include a detection result of the predetermined state quantity detected by the terminal that transmitted the data.

3. The communication control method according to claim 1,
   wherein the data are accompanied by time-point information indicating time points when the terminal detected predetermined state quantities, the time-point information serving as the acquisition time points; and
   the predetermined processing includes processing for aggregating the data in accordance with an order of the time points indicated by the time-point information.

4. The communication control method according to claim 1,
   wherein, in the receiving the data, data acquired by one of the terminals is received via another terminal of the terminals;
   data transmitted from the respective terminals include up/down information indicating up/down statuses of the respective terminals in the communication network; and
   the predetermined processing includes processing for controlling a transmission path of the data in the communication network, based on the up/down information.

5. The communication control method according to claim 1,
   wherein the data are encapsulated into packets and are transmitted through the communication network, and
   the receiving the data further includes
   detecting a dropped packet in the packets; and
   requesting, when a dropped packet is detected, the terminal that is a transmission source of the dropped packet to re-transmit the dropped packet,
   wherein, in the obtaining the intra-network transmission time, the intra-network transmission time is obtained by calculating an estimated value of a maximum time taken for transmitting the data, the maximum time including a time taken for a re-transmission time of the data.

6. The communication control method according to claim 5, the method further comprising:
   obtaining, through the communication network, communication status information indicating a communication status of each terminal located on a transmission path established in the communication network,
   wherein, in the obtaining the intra-network transmission time, the intra-network transmission time is calculated based on the obtained communication status information.

7. The communication control method according to claim 1,
   wherein a processor is used to perform at least one of the receiving the data, the accumulating the data, the obtaining the intra-network transmission time, the determining the data, the excluding the data, and the executing the predetermined processing.

8. A communication control apparatus used in a communication system, the apparatus comprising:
   a data receiver that receives data, acquired by respective terminals, through a communication network that includes a network for wireless communication;
   a data accumulator that accumulates the received data in an information recording medium;
   an intra-network transmission-time obtainer that obtains an intra-network transmission time, which is an estimated value of a maximum time taken for transmission from when the data are acquired by the respective terminals until the data are received through the communication network;
   a data-to-be-processed controller that determines, of the data accumulated in the information recording medium, the data whose time from a time point when the data is acquired by the respective terminals until a current time is shorter than the intra-network transmission time and that excludes, from data used for predetermined processing, the data whose time is determined to be shorter than the intra-network transmission time; and
   a processing executor that executes the predetermined processing by using, of the data accumulated in the information recording medium, the data excluding the data whose time is determined to be shorter than the intra-network transmission time,
   wherein intra-network transmission-time obtainer further obtains a communication status of the communication network each time the predetermined processing is performed, and calculates the intra-network transmission time based on the obtained communication status.

9. The communication control apparatus according to claim 8,
   wherein at least one of the data receiver, the data accumulator, the intra-network transmission-time obtainer, the data-to-be-processed controller, and the processing executor comprises a processor.

* * * * *